Patented May 5, 1953

2,637,712

UNITED STATES PATENT OFFICE 2,637,712

COPOLYMERS OF VINYL ACETATE WITH DERIVATIVES OF ALPHA, BETA-UNSATURATED DICARBOXYLIC ACIDS

Wilson Vincent Upton, New York, N. Y., assignor to National Starch Products, Inc., New York, N. Y., a corporation of Delaware No Drawing. Application January 21, 1949, Serial No. 72,081

12 Claims. (Cl. 260—29.6)

This invention relates to the production of new resinous products characterized by improved properties of particular value for adhesives, coatings and related industrial uses. The prime object of my invention is to produce resinous compositions of greater adhesive strength, higher resistance to heat, higher shear strength and other improved properties, as compared to previously known compositions.

It has been known to employ polyvinyl acetates, either in the form of solutions or emulsions, as adhesives. Although they are quite satisfactory for some adhesive applications, many industrial operations require adhesives of greater strength and heat resistance, among other improved characteristics.

I have discovered that new and notably improved resinous compositions may be prepared by the copolymerization of monomeric vinyl acetate with small proportions of a compound selected from the anhydrides of alpha, beta-ethylenically unsaturated dicarboxylic acid and the substituted or unsubstituted mono-esters formed by the reaction of an alpha, beta-ethylenically unsaturated dicarboxylic acid with a saturated aliphatic alcohol. Examples of such acid anhydrides are maleic, itaconic and citraconic acid anhydrides, and among the aliphatic mono-esters are methyl hydrogen maleate, ethyl hydrogen maleate, n-propyl hydrogen maleate, iso-propyl hydrogen maleate, butyl hydrogen maleate, octyl hydrogen maleate, alpha-carboxyethyl hydrogen maleate, beta-chloroethyl hydrogen maleate, as well as the corresponding fumarates, itaconates and citraconates.

It will be noted that I do not include the alpha, beta-unsaturated dicarboxylic acids themselves, nor their di-esters, nor their non-aliphatic mono-esters.

By "small proportions" I refer to the use of not substantially more than 10% of the mono-ester or anhydride, based on the weight of the vinyl acetate, while as little as 0.5% has been found to be very effective.

The mechanism of the polymerization reaction involves mixing the following ingredients in a polymerization kettle, equipped with reflux condensers and mechanical agitation:

(1) An organic solvent, such as ethyl acetate, ethyl alcohol, benzene or acetone, which will act as a solvent for both components of the copolymerization as well as for the final copolymer.

(2) Vinyl acetate.

(3) The anhydride or the aliphatic mono-ester of the alpha, beta-unsaturated dicarboxylic acid.

(4) A polymerization catalyst such as, for example, benzoyl peroxide, hydrogen peroxide, lauroyl peroxide or acetyl peroxide.

The quantity of the solvent is subject to wide variation, as will be apparent to those skilled in the art, depending upon the viscosity desired in the final copolymer solution. Generally, I prefer to use a quantity of solvent ranging from about one-fifth of a part to one part by weight, for each part of the vinyl acetate, adding about one-half of this solvent in the beginning, and the remainder in two or more parts at intervals during the course of the reaction, in order to control the viscosity of the reaction mass. If desired, the entire quantity of solvent may be added at the beginning.

As already stated, it is not advisable to employ more than 10% of the anhydride or aliphatic mono-ester, based on the weight of the vinyl acetate, since larger proportions result in a product whose corrosiveness, lack of flexibility and other disadvantageous properties tend to render it valueless for the purposes of my invention. On the other hand, quantities as low as 0.5% have proved decidedly effective. Although the specific amount of the maleic, fumaric, itaconic or citraconic component to be used will depend upon the exact specifications set up for the final copolymer product with regard to flexibility, adhesive strength, heat resistance and the like, I find it preferable for most purposes to use 5% or less (based upon the weight of the vinyl acetate).

The quantity of polymerization catalyst varies somewhat with the particular catalyst chosen. In the case of benzoyl peroxide, I prefer to use about 0.2% to .2%, based on the weight of the vinyl acetate.

The mixture in the polymerization kettle is heated to reflux temperature, and refluxing continued until copolymerization is substantially complete (as may be checked by standard methods as, for example, by solids determination). As stated, I have sometimes found it advisable that solvent be added at intervals during the reaction, to control the viscosity of the reaction mass. Similarly, the anhydride or mono-ester may be added slowly, at intervals, since this tends to achieve a more homogeneous final lacquer.

The reaction is ordinarily completed in less than ten hours, and frequently is found to require only about five or six hours. Variables which affect the time of the reaction include the temperature, nature and concentration of the reagents, solvent and catalyst.

The resulting product is a clear lacquer—that is, a solution of the resin copolymer in an organic solvent. For many industrial applications, the use of this lacquer is entirely satisfactory. However, it is frequently found desirable to use resinous adhesives in the form of their aqueous dispersions, largely because organic solutions are often accompanied by disadvantages such as unpleasant or toxic vapors, flammability and difficulty of application.

The product of my invention may be dispersed in water with the aid of emulsifying agents, to give excellent, stable, small particle size dispersions. Examples of such emulsifying agents are polyvinyl alcohol, carboxymethyl cellulose, sodium alginate, also polysaccharide derivatives of the type described in copending application Serial Number 77,296, filed February 18, 1949, which covers a substituted polysaccharide wherein each substituent radical contains both a hydrophilic and a hydrophobic group. Another effective emulsifying agent is the sodium or ammonium salt of a styrene-maleic anhydride copolymer, copolymerized in an approximately 50/50 mol ratio (of the type distributed under the trade name Resin SYHM, by the Bakelite Corp., unit of Carbide and Carbon Chemicals Corp.). I have found that certain of the improved properties of my product, particularly heat resistance, are enhanced when the product is used in the form of its aqueous dispersion, and this is especially true when polyvinyl alcohol alone or in combination with other emulsifying agents is used in preparing this dispersion.

After emulsification, the organic solvent, such as the ethyl acetate, can be removed from the emulsion by distillation at atmospheric pressure, or by vacuum or steam. The solvent which is removed by any of these methods contains substantial amounts of moisture. An important factor in the economic use of my process is that this moisture-laden solvent may be re-used directly as the solvent agent in the subsequent copolymerization of additional quantities of vinyl acetate and the aliphatic mono-ester of maleic, fumaric, itaconic or citraconic acid, without the necessity of preliminary pre-drying of the solvent. This copolymerization of vinyl acetate with the aliphatic mono-ester, directly in wet solvent, represents the first time, to my knowledge, that it has been found possible to copolymerize vinyl acetate with relatively small proportions of compounds of the maleic, fumaric, itaconic or citraconic types, containing free carboxyl groups, in the presence of substantial amounts of moisture, without objectionable amounts of unreacted free acid remaining. Of course, the reaction also proceeds as well under anhydrous conditions.

When the anhydride of the alpha, beta-unsaturated dicarboxylic acid is used, instead of the mono-ester, in the copolymerization with vinyl acetate, it is necessary that substantially anhydrous conditions prevail, otherwise it is found that the anhydride is hydrolized to produce appreciable quantities of the corresponding acid (i. e., maleic acid, fumaric acid, etc.).

The copolymerized resin of my invention is soluble in the lower alcohols, ketones and aromatic solvents, giving clear lacquers. The resinous films formed upon application of the lacquer (or dispersion) to a surface, followed by evaporation of the solvent or water, range from clear, colorless and transparent to slightly opaque, depending upon the composition of the copolymer. The copolymerized resin is substantially insoluble in dilute alkalis and acids as well as in the aliphatic hydrocarbons.

The actual proportion of maleic acid units (or fumaric, itaconic or citraconic acid, as the case may be) in the finished copolymer may be readily determined by titration with standard alkali solution.

As compared to polyvinyl acetate, the copolymerized resins of my invention exhibit marked improvements, including the following:

(a) They are more powerful adhesives, being especially useful on rigid or semi-rigid surfaces such as metals, including stainless steel, wool, cellulose acetate and plastics generally.

(b) They deposit excellent glue films, which are homogeneous and easily spread.

(c) Films deposited from their aqueous dispersions are tackier immediately upon application, and set more rapidly. Thus, the clamping time is reduced; that is, the period during which two adhered surfaces are held together under applied pressure until the adhesive has set sufficiently to hold the surfaces together.

(d) Their films, and surfaces adhered thereby, possess higher shear and tensile strength, a factor of particular importance in applications to rigid surfaces. Furthermore, their films, and surfaces adhered thereby, possess remarkably superior heat resistance within the range 110°–150° F. and are, in fact, thermosetting at higher temperatures. This maintenance of adhesive strength upon exposure to heat is evident even at intermediate temperatures below that at which the resin becomes thermosetting. These improvements are especially pronounced when the film is deposited from an aqueous dispersion of the copolymerized resin. As previously pointed out, the use of polyvinyl alcohol as the emulsifying agent in producing the resin dispersion, particularly enhances these improvements. Furthermore, a dispersion of my product is found to possess these advantages even when compared to a simple polyvinyl acetate dispersion of substantially higher solids content.

On the other hand, the above improvements are not achieved, to my knowledge, when vinyl acetate is copolymerized with relatively large proportions of maleic anhydride, or in any proportions with the di-esters of maleic acid or the non-aliphatic mono-esters thereof.

The following examples will further illustrate the embodiment of my invention.

*Example I*

This example illustrates the copolymerization of vinyl acetate with maleic anhydride, as well as the emulsification of the resultant product. In this, as in the subsequent examples, all parts given are by weight.

In a flask equipped with mechanical stirrer and reflux condenser were placed 300 parts of vinyl acetate, 6 parts maleic anhydride, 100 parts of anhydrous ethyl acetate and 1.5 parts benzoyl peroxide. After heating the mixture at reflux temperature (approximately 71° C.) for three hours, 90 parts of ethyl acetate were added, and again, after two hours, an additional 45 parts ethyl acetate were added. After approximately thirty-two hours heating, copolymerization was substantially complete.

In order to form an emulsion of this copolymer lacquer, 500 parts of the lacquer were added to 238 parts of a 10.5% aqueous solution of polyvinyl alcohol (I used the polyvinyl alcohol sold by E. I. du Pont de Nemours & Co. under the trade name Elvanol 52-22). Upon stirring, a heavy oil-in-water emulsion was formed, to which were added an additional 35 parts water, followed by stirring for thirty minutes. The ethyl acetate was then removed from the emulsion by distilling, with agitation, under reduced pressure. The product was a white, smooth fluid.

In order to test the adhesive strength of this material, I subjected it to the Glued Block Shear Test, as used by the Forest Products Laboratory of the U. S. Department of Agriculture, and designated as Block Shear Strength Test in Specification ANG-8. Using the copolymer dispersion of this example as the adhesive, joints prepared with standard maple blocks showed compression strength of 3874 lbs./sq. in., with resultant 45% of wood failure.

For purposes of comparison, a polyvinyl acetate dispersion prepared according to the method given here for preparation of the copolymer dispersion, was subjected to the same Glued Block Shear Test. The joints in this case showed compression strength of 3174 lbs./sq. in., with no perceptible wood tear.

Heat resistance of the bond formed by the adhesive of my invention was determined by the Static Load Test, as described by the Forest Products Laboratory in their publication R-1637, modified for control of heat and humidity. Lap joints of straight grain birch were prepared, under uniform conditions of moisture, clamping pressure and glue spread, each lap joint having a glued cross-section of one square inch. Four identical specimens were tested for tensile shear strength, and the average tensile shear strength was thus computed. Then, splints were tested under static loads of 20% of this average tensile shear strength figure. Joints glued with the copolymer dispersion of this example resisted delamination at 125° F. and 4% relative humidity for thirty days (at which time the test was discontinued). Joints glued with the simple polyvinyl acetate dispersion failed within three and one-half hours, under similar conditions.

*Example II*

This example illustrates the copolymerization of vinyl acetate with ethyl hydrogen maleate.

In a stainless steel kettle equipped with mechanical agitator and reflux condenser, were placed 300 parts of vinyl acetate. To this I added 100 parts of ethyl acetate, which had been saturated with water as a result of recovery, by means of steam distillation, from a previous batch of resin emulsion. There were also added 0.9 part of ethyl hydrogen maleate and 1.5 parts of lauroyl peroxide. The mixture was heated to 66° C., at which point refluxing began. Immediately upon commencement of refluxing, 0.45 part ethyl hydrogen maleate was added, with like amounts being added after ten minutes and fifteen minutes heating, respectively. After heating the solution at reflux temperature for five hours, 140 parts of ethyl acetate were added and heating discontinued.

Using the emulsification procedure described in Example I, 12 parts of this lacquer were emulsified in 4.5 parts of a 15% aqueous solution of polyvinyl alcohol (Du Pont's Elvanol 52-22) and stirred for fifteen minutes. With continued stirring, the ethyl acetate was removed by passing steam through the emulsion. This moisture-laden ethyl acetate was ready for reuse, without preliminary drying or other processing, in a subsequent copolymerization reaction.

*Example III*

This example illustrates the copolymerization of vinyl acetate with ethyl hydrogen fumarate. In equipment of the type already described, a mixture of 300 parts vinyl acetate, 100 parts ethyl acetate, 1.5 parts of benzoyl peroxide and 0.8 part of ethyl hydrogen fumarate were heated, with stirring, to reflux temperature (approximately 72° C.). A solution was prepared of 8 parts of ethyl hydrogen fumarate in 22.5 parts ethyl acetate, and this solution was added gradually, by means of a dropping funnel, over a two hour period, to the refluxing mixture. After seven and one-half hours heating at reflux temperature, the reaction was substantially complete and heating discontinued.

250 parts of this lacquer were emulsified with 67 parts of a water solution containing 12% of polyvinyl alcohol and 2% of the sodium salt of a styrene-maleic anhydride copolymer (of the type previously described). The ethyl acetate was removed by vacuum distillation, water being subsequently added to replace that lost during distillation.

*Example IV*

This example illustrates the copolymerization of vinyl acetate with maleic anhydride.

In a glass-lined kettle equipped with reflux condenser and mechanical agitator were placed 3300 parts vinyl acetate and 330 parts of maleic anhydride. To this was added a solution of 16.5 parts acetyl peroxide in 1100 parts ethyl acetate. This mixture was heated by steam jacket and maintained at reflux temperature (approximately 73° C.) for eighteen hours.

A portion of the resulting lacquer was emulsified in water, in the manner described in Example I, and the ethyl acetate removed by evaporation at temperatures up to 78° C. Water was added to bring the emulsion to the desired solids content.

*Example V*

This example illustrates the copolymerization of vinyl acetate with n-propyl hydrogen maleate.

In a stainless steel kettle equipped with mechanical stirrer and reflux condenser, were placed 9 parts n-propyl hydrogen maleate, 306 parts of vinyl acetate and 102 parts of ethyl acetate. After stirring five minutes, 1.2 parts benzoyl peroxide were added, and mixing continued fifteen minutes to insure complete homogeneity of the mixture. The temperature was raised to 60° C. over a period of approximately one and one-half hours. The reaction solution was maintained at reflux temperature for five hours, at which time the solution was thinned with 29.5 parts of ethyl acetate. Heating was continued until the total refluxing time had been about seven hours. Before cooling, 97.5 parts of ethyl acetate were added, and stirred until smooth.

The lacquer was emulsified by mixing 200 parts of the lacquer into 117 parts of water in which 7.2 parts of a styrene-maleic anhydride copolymer (of the type already described) had been dissolved with 10 parts of a 14% aqueous solution of ammonium hydroxide. The ethyl acetate was removed from the emulsion by distilling under reduced pressure.

*Example VI*

This example illustrates the copolymerization of vinyl acetate with ethyl hydrogen itaconate.

In equipment of the type described in the previous examples were placed 300 parts of vinyl acetate, 1.5 parts of benzoyl peroxide and 9.7 parts of ethyl hydrogen itaconate (the latter dissolved in 100 parts of diethylene dioxide, commercially known as Dioxane). The mixture was heated at reflux temperature. During reflux, the mass became progressively heavier, and portions of Dioxane, each comprising 50 parts, were added after one and one-half, two and three-quarters and eight and three-quarters hours reflux, respectively. Refluxing was continued for a total of twelve hours, resulting in a clear, yellowish lacquer, which could be emulsified by the herein-described methods.

In equipment of the type previously described were placed 300 parts of vinyl acetate, 9.7 parts ethyl hydrogen citraconate, 100 parts acetone and 1.5 parts of benzoyl peroxide. The solution was heated at reflux temperature for four hours, then cooled overnight. Upon again heating to reflux temperature, 0.75 part of benzoyl peroxide was added. In order to thin the solution, 43 parts of acetone were added after total reflux time of eight hours, and an additional 87 parts of ethyl acetate were added after total reflux time of eleven hours. The resulting clear lacquer could be emulsified, if desired, by the herein-described methods.

Example VIII

This example illustrates the copolymerization of vinyl acetate with octyl hydrogen maleate.

In equipment of the type previously described were placed 300 parts of vinyl acetate, 1.5 parts of octyl hydrogen maleate, 100 parts of ethyl alcohol and 1.5 parts of benzoyl peroxide. The solution was heated at reflux temperature. An additional 12.5 parts of octyl hydrogen maleate were dissolved in 22 parts of ethyl alcohol and added very slowly to the refluxing solution, over a period of two hours. As the solution thickened, it was found desirable to add 22 parts additional ethyl alcohol after three and one-half hours reflux, 44 parts after four and one-half hours total reflux and again 44 parts after six and one-quarter hours. Reflux was continued for a total of seven and one-half hours. The resulting clear lacquer could be emulsified by the herein-described methods.

It is to be understood that the above examples have been given in order to illustrate specific embodiments of my invention, but many variations in procedure, types and quantities of reagents may be made therein without departing from the scope of the invention.

I am aware that it has been proposed to form copolymers of vinyl esters with maleic acid, maleic anhydride or certain derivatives thereof. Thus, in U. S. Patent 2,047,398, there is described a method for the copolymerization of vinyl resins with large proportions of maleic acid or maleic anhydride. By "large proportions" is meant anywhere from 50% to well over 100% of the maleic compound, based upon the vinyl compound. Aside from the maleic acid and anhydride, there are suggested in the aforementioned patent the use of the diallyl esters and the mono-phenyl ester of maleic acid. However, resins made by the copolymerization of vinyl acetate and maleic anhydride according to the method of that patent, result in films which are relatively hard, inflexible, brittle, very corrosive and quite devoid of the improved adhesive properties I have indicated to be the objects of my invention. Similarly, the copolymerization of vinyl acetate with the di-esters of maleic acid results in a product characterized by no noticeable improvement in adhesive strength, as compared to vinyl acetate. This failure to achieve my described objects is found to be true also when it is attempted to copolymerize vinyl esters with maleic acid or non-aliphatic mono-esters of maleic acid, since polymerization, in some cases, is unsatisfactory or impossible under commercial conditions, and in others the final product is not substantially improved. It is thus clear that the methods of the reference patent are not relevant to the attainment of my objectives.

I am also aware of U. S. Patent 2,329,456 wherein maleic acid or certain of its derivatives are reacted with vinyl acetate and vinyl chloride, to produce a modified conjoint vinyl acetate-chloride polymer, wherein the chloride is the major component. However, it is well known that the conjoint vinyl acetate-chloride polymer, whether modified or unmodified, is very different in its properties from vinyl acetate alone, and not suitable for many of the adhesive applications contemplated by my invention. The conjoint vinyl acetate-chloride polymer is a relatively tough material with a high softening temperature and does not even compare as an adhesive with polyvinyl acetate, at room temperatures. Thus, the motive in combining this conjoint polymer with a maleic compound is essentially to attempt to make an adhesive material out of the comparatively non-adhesive conjoint polymer. On the other hand, the motive of my invention is to treat the less expensive (and for most adhesive purposes, more desirable) simple vinyl acetate in such a manner as to improve its adhesive power, heat resistance and other characteristics above described, while retaining the desirable properties of the simple vinyl acetate.

I claim:

1. The copolymerization process which comprises reacting under polymerization conditions the polymerizable mixture consisting of vinyl acetate and a compound selected from the group consisting of the anhydrides of alpha, beta-ethylenically unsaturated dicarboxylic acid and the mono-esters formed by the reaction of an alpha, beta-ethylenically unsaturated dicarboxylic acid with a saturated aliphatic alcohol, the proportion of said compound being not substantially greater than 10% based on the weight of the vinyl acetate.

2. The copolymerization process which comprises heating at reflux temperature a polymerizable mixture consisting of vinyl acetate, a compound selected from the group consisting of anhydrides of alpha, beta-ethylenically unsaturated dicarboxylic acid and the mono-esters formed by the reaction of an alpha, beta-ethylenically unsaturated dicarboxylic acid with a saturated aliphatic alcohol, an organic solvent which is a solvent for the vinyl acetate and the said compound as well as the resulting copolymer, a polymerization catalyst, the said compound being in the proportion of not substantially more than 10% by weight of the vinyl acetate, and continuing heating at said temperature until copolymerization is substantially complete.

3. The copolymerization process of claim 2, in which the obtained copolymer is water insoluble and is dispersed in water.

4. In the copolymerization process of claim 3, the added step of removing solvent from the aqueous dispersion.

5. The process which comprises heating at reflux temperature a polymerizable mixture consisting of (A) vinyl acetate, (B) a compound selected from the group consisting of anhydrides of alpha, beta-ethylenically unsaturated dicarboxylic acid and the mono-esters formed by the reaction of an alpha, beta-ethylenically unsaturated dicarboxylic acid with a saturated aliphatic alcohol, (C) an organic solvent which is a solvent for (A) and (B) as well as for the resulting copolymer, and (D) a polymerization catalyst, (B) being in the proportion of not substantially more than 10% by weight of (A), and continuing heating at said temperature until copolymerization is substantially complete and thereupon dispersing the resulting water insoluble copolymer in water containing dispersed therein an emulsifying agent, said emulsifying agent being polyvinyl alcohol.

6. The process of claim 1, wherein the aliphatic mono-ester is ethyl hydrogen maleate.

7. The process of claim 1, wherein the aliphatic mono-ester is methyl hydrogen maleate.

8. The process of claim 1, wherein the aliphatic mono-ester is ethyl hydrogen fumarate.

9. The process of claim 1, wherein the aliphatic mono-ester is methyl hydrogen fumarate.

10. The copolymerization product of vinyl acetate and a compound selected from the group consisting of anhydrides of alpha, beta-ethylenically unsaturated dicarboxylic acid and the mono-esters formed by the reaction of an alpha, beta-ethylenically unsaturated dicarboxylic acid with a saturated aliphatic alcohol, the proportion of said compound being not substantially greater than 10% based on the weight of the vinyl acetate.

11. A lacquer comprising the copolymerization product of claim 10, in which the vinyl acetate and said compound have each been dissolved in a solvent which is also a solvent for the resulting copolymer.

12. An aqueous resin dispersion comprising the lacquer of claim 11 dispersed in water.

WILSON VINCENT UPTON.

References Cited in the file of this patent

UNITED STATES PATENTS

| Number | Name | Date |
| --- | --- | --- |
| 2,047,398 | Voss et al. | July 14, 1936 |
| 2,245,131 | Herrmann et al. | June 10, 1941 |
| 2,317,725 | Billig | Apr. 27, 1943 |
| 2,321,422 | Robie | June 8, 1943 |
| 2,324,078 | Gray | July 13, 1943 |
| 2,329,456 | Campbell | Sept. 14, 1943 |
| 2,404,781 | Arnold et al. | July 30, 1946 |
| 2,444,094 | Duggan | June 29, 1948 |
| 2,470,908 | Baer | May 24, 1949 |
| 2,476,474 | Baer | July 19, 1949 |
| 2,482,087 | Foster | Sept. 20, 1949 |

OTHER REFERENCES

Du Pont, "Water Emulsions of Polyvinyl Acetate," published by The R. and H. Chemicals Dept. of E. I. du Pont de Nemours & Co., Inc., Wilmington, Del., 4 pp., received by Patent Office Library Nov. 13, 1943.

Vinylite Copolymer Resins, published by Carbide and Carbon Chemicals Corp., Plastics Division, 1942, pages 77–81.